UNITED STATES PATENT OFFICE

FRITZ STRAUB AND ERNST BRUNNER, OF BASEL, SWITZERLAND, ASSIGNORS TO SOCIETY OF CHEMICAL INDUSTRY IN BASLE, OF BASEL, SWITZERLAND

CHROMIFEROUS AZO-DYESTUFFS AND PROCESS OF MAKING SAME

No Drawing. Application filed June 30, 1932, Serial No. 620,307, and in Switzerland September 29, 1931.

The present invention relates to the manufacture of new azo-dyestuffs containing chromium. It comprises the process of making these dyestuffs, as well as the new dyestuffs themselves.

According to this invention new chromiferous azo-dyestuffs are obtained by treating with agents yielding chromium azo-dyestuffs of the general formula

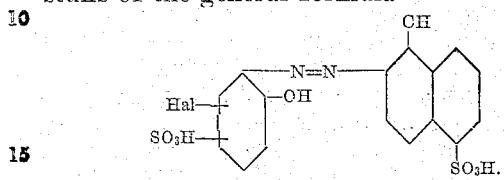

As diazo-components for making the parent dyestuffs for this invention there come into consideration in particular the diazo-compound of 4-chloro-2-amino-1-phenol-6-sulfonic acid, of 6-chloro-2-amino-1-phenol-4-sulfonic acid and of 4-chloro-2-amino-1-phenol-5-sulfonic acid, and also those of the corresponding bromo-derivatives.

The treatment with the agent yielding chromium may be conducted in a neutral or alkaline medium, at atmospheric pressure, or under increased pressure, and in presence or absence of suitable additions, for instance an inorganic or an organic alkali salt.

The chromium compounds obtainable in accordance with the invention dye wool reddish-blue tints of good properties of fastness; they are particularly suitable for the production of the valuable marine blue tints.

The following examples illustrate the invention, the parts being by weight:—

Example 1

44.7 parts of the azo-dyestuff from diazotized 4-chloro-2-amino-1-phenol-6-sulfonic acid and 1-hydroxynaphthalene-5-sulfonic acid of the formula

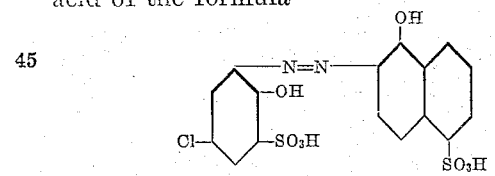

are dissolved in 1600 parts of hot water and the solution is mixed with 11.4 parts of chromium oxide (100 per cent. strength) in the form of a chromium fluoride solution and boiled in a reflux apparatus for some time. After cooling, the chromium compound thus produced is salted out, filtered and washed with common salt solution of 10 per cent. strength, and finally dried. It is a violet brown powder, soluble in water, sodium carbonate solution of 10 per cent. strength or caustic soda solution of 10 per cent. strength to a reddish-violet solution, and in concentrated sulfuric acid to a green solution. It dyes wool in a bath acid with sulfuric acid blue-violet tints of good properties of fastness.

Chromium compounds with similar properties are obtained when the chroming is accomplished by means of other agents yielding chromium, such as chromium formate, chromium sulfate, chromium chloride.

Example 2

A dye-bath is prepared containing 3 per cent. of sulfuric acid of 66° Bé. and the wool is handled in this bath at 60° C. for 10-15 minutes. The thoroughly dissolved dyestuff produced as described in Example 1, is then added to the bath and dyeing is continued for ½ hour at 60° C. and the bath is then gradually raised to the boil, whereafter a further 5 per cent. of sulfuric acid of 66° Bé. is added. Boiling follows for ½ to ¾ hour until the color tint is fully developed.

What we claim is:—

1. Process for the manufacture of chromiferous azo-dyestuffs, consisting in treating with agents yielding chromium azo-dyestuffs of the general formula

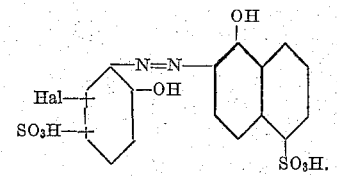

2. Process for the manufacture of chromiferous azo-dyestuffs, consisting in treating with agents yielding chromium azo-dyestuffs of the general formula

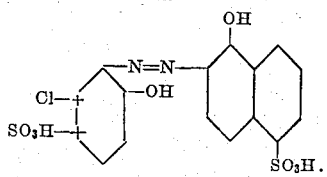

3. Process for the manufacture of a chromiferous azo-dyestuff, consisting in treating with agents yielding chromium the azo-dyestuff of the formula

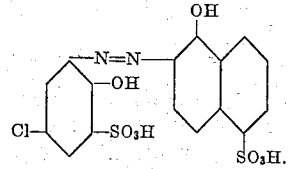

4. Chromiferous azo-dyestuffs, which azo-dyestuffs correspond with the general formula

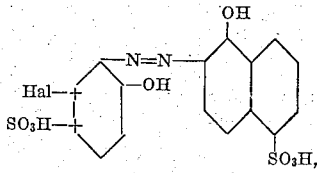

which products form violet-brown powders which dissolve in water and dilute alkalies to violet and in concentrated sulfuric acid to green solutions, dyeing wool blue-violet tints of good fastness properties.

5. Chromiferous azo-dyestuffs, which azo-dyestuffs correspond with the general formula

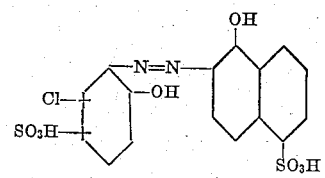

which products form violet-brown powders which dissolve in water and dilute alkalies to violet and in concentrated sulfuric acid to green solutions, dyeing wool blue-violet tints of good fastness properties.

6. Chromiferous azo-dyestuff, which azo-dyestuff corresponds with the formula

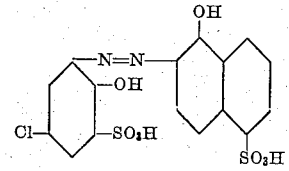

which product forms a violet-brown powder which dissolves in water and dilute alkalies to violet and in concentrated sulfuric acid to green solutions, dyeing wool blue-violet tints of good fastness properties.

In witness whereof we have hereunto signed our name this 18th day of June 1932.

FRITZ STRAUB.
ERNST BRUNNER.